(12) United States Patent
Mohlin et al.

(10) Patent No.: US 8,181,314 B2
(45) Date of Patent: May 22, 2012

(54) HOSE CLAMP

(75) Inventors: Roland Mohlin, Gnosjö (SE); Lennart Andersson, Bor (SE)

(73) Assignee: Norma Sweden AB, Anderstorp (SE)

( * ) Notice: Subject to any disclaimer, the term of this patent is extended or adjusted under 35 U.S.C. 154(b) by 744 days.

(21) Appl. No.: 11/887,577

(22) PCT Filed: Mar. 17, 2006

(86) PCT No.: PCT/SE2006/000335
§ 371 (c)(1),
(2), (4) Date: Jun. 3, 2008

(87) PCT Pub. No.: WO2006/104439
PCT Pub. Date: Oct. 5, 2006

(65) Prior Publication Data
US 2009/0100647 A1    Apr. 23, 2009

(30) Foreign Application Priority Data

Apr. 1, 2005  (SE) ...................... 0500721

(51) Int. Cl.
*F16L 33/04* (2006.01)
(52) U.S. Cl. ........................................ 24/279
(58) Field of Classification Search ............ 24/279–286; 285/367, 410, 420, 253
See application file for complete search history.

(56) References Cited

U.S. PATENT DOCUMENTS

| | | | |
|---|---|---|---|
| 1,467,708 A | 9/1923 | Cooper | |
| 1,641,559 A * | 9/1927 | Thompson | 24/279 |
| 2,677,164 A * | 5/1954 | Stade | 24/279 |
| 2,874,441 A | 2/1959 | Erie | |
| 3,151,373 A * | 10/1964 | Whitcomb | 24/279 |
| 3,861,723 A * | 1/1975 | Kunz et al. | 285/410 |
| 4,365,393 A * | 12/1982 | Hauffe et al. | 24/279 |
| 4,521,940 A | 6/1985 | Oetiker | |
| 4,905,353 A * | 3/1990 | Gari | 24/286 |
| 5,329,673 A * | 7/1994 | Mason | 24/279 |
| 5,474,269 A | 12/1995 | Kasubke | |

(Continued)

FOREIGN PATENT DOCUMENTS

DE    198 22 915    9/1999

(Continued)

OTHER PUBLICATIONS

Decision to Grant issued May 22, 2009 for corresponding Russian Application No. 2007140368/06(044184) and English translation thereof.

(Continued)

*Primary Examiner* — James Brittain
(74) *Attorney, Agent, or Firm* — Harness, Dickey & Pierce, P.L.C.

(57) ABSTRACT

A hose clamp (1) comprises bands (2) forming an open ring. The ends of the open ring have band loops (3, 4) arranged around housing portions (5, 6), between which housing portions (5, 6) a clamping screw (7) with a head (8) is arranged. The bands (3, 4) adjacent to the housing portions (5, 6) have slots (9, 10). The band loop (4) along the slot (10), at least adjacent to the head (8) of the clamping screw, is turned on both sides of the slot (10) in such a manner that the distance between the band portions (11) turned adjacent to the slot (10) adjacent to the head (8) of the clamping screw is greater than the outer diameter of the head (8) of the clamping screw.

16 Claims, 2 Drawing Sheets

U.S. PATENT DOCUMENTS 6,490,765 B2 * 12/2002 Anthes et al. ................... 24/279

FOREIGN PATENT DOCUMENTS

| FR | 1 403 471 A | 6/1965 |
|---|---|---|
| JP | 49-139559 | 11/1974 |
| JP | 58-203285 | 11/1983 |
| JP | 63-107313 | 8/1988 |
| RU | 2 075 002 C1 | 3/1997 |
| SU | 916 869 | 3/1982 |
| WO | WO 2005/079297 | 9/2005 |

OTHER PUBLICATIONS

European Search Report dated Mar. 28, 2011 for corresponding European Patent Application No. EP 06 71 7020.
Office Action mailed Jun. 17, 2011 for corresponding Japanese Patent Application No. 2008-503990, and English translation.
Office Action dated Feb. 15, 2012 for corresponding European Patent Application No. 06 717 020.9-1252.
English Translation of Office Action dated Feb. 3, 2012 for corresponding Japanese Patent Application No. 2008-503990.

* cited by examiner

HOSE CLAMP

This application is a National Phase entry of PCT Application no. PCT/SE2006/000335 filed on Mar. 17, 2006, under 35 U.S.C. §365(c), which claims priority to SE 0500721-6, filed on Apr. 1, 2005.

FIELD OF THE INVENTION

The present invention relates to a hose clamp comprising bands forming an open ring, the ends of the open ring having band loops arranged around housing portions, between which housing portions a clamping screw is arranged, the bands adjacent to the housing portions having slots.

BACKGROUND ART

Hose clamps as described above are frequently used. Such hose clamps are usually made of a single band with a width, the band at the ends of the open ring forming closed loops around housing portions, which housing portions in turn act as a link between the band and a clamping screw. To allow the clamping screw to be attached to the housing portions, the band has adjacent to the closed loops a slot which is sufficiently wide to allow the head of the clamping screw to be easily inserted through the slot. Due to the slot, the tensile stress in these portions of the band increases. To compensate for this, the total width of the band is increased so that the weakest link of the hose clamp, that is adjacent to the slots, satisfies the strength requirements. A problem is here that the hose clamp requires a relatively large space.

SUMMARY OF THE INVENTION

The object of the present invention therefore is to provide a hose clamp of the type stated above, which, however, basically with retained strength is substantially narrower than a hose clamp according to prior art.

According to the invention, this object is achieved by a device having the features defined in claim 1, preferred embodiments being defined in claims 2-15.

The inventive hose clamp comprises bands forming an open ring, the ends of the open ring having band loops arranged around housing portions, between which housing portions a clamping screw is arranged, the bands adjacent to the housing portions having slots. Furthermore, the band loop is along the slot, at least adjacent to the head of the clamping screw, angled upwards on both sides of the slot in such a manner that the distance between the band portions angled upwards adjacent to the slot adjacent to the head of the clamping screw is greater than the outer diameter of the head of the clamping screw. Thus the cross-sectional area of the band adjacent to the slots is greater relative to the rest of the band without a slot compared with prior art, where the width of the slot occurs at the expense of the cross-sectional area of the band adjacent to the slots. Preferably, the band adjacent to the slots is turned in such a manner that the upwards angling is soft and continuous, that is so that no sharp edges and corners are formed, which if the worst comes to the worst reduce the strength.

In one embodiment of the invention, at least one of the housing portions is cylindrical, around which cylindrical portion said band loop extends at least along part of the circumferential surface of the cylinder. The round shape of the circumferential surface of a cylinder is an advantage in terms of strength since the band around the cylinder thus has no sharp corners or edges.

In an alternative embodiment, the band of the open ring and the band loops at the ends of the open ring consist of a single band. In terms of manufacture, this is time-saving and consequently economically advantageous. The slots are thus punched at the ends of the band for the closed loops which are arranged around the housing portions. In one embodiment, a slot is punched at each end of the band and the band at the side of the slot/slots is angled upwards to increase the width of the slot/slots.

In a further alternative embodiment, said band forms at least at one end of the band a closed loop, the end portion of the end of the band being attached to the band material on a portion adjoining the loop. As described above, it is thus possible to use one and the same band for both the open ring and the closed loops, the closed loops being "drop-shaped", that is a closed loop is formed from a band between the ends of which, where the ends meet, an angle occurs (in contrast to a round loop where the band at the ends and the contact portion extend in the same direction). The closed loops at the ends of the open ring can be made as separate band portions which are attached to the ends of the open ring.

In an alternative embodiment, said at least one housing portion of cylindrical shape has a threaded through hole with an inlet and an outlet in the circumferential surface, into which threaded hole the clamping screw is screwable. This solution allows simple adjustment and tightening of the hose clamp where the clamping screw can be screwed freely into this through hole. Preferably, the hole is arranged through the centre of the housing portion to create a uniform load, that is without the loop, the housing portion and the clamping screw being subjected to oblique loads.

In yet another embodiment of the hose clamp, said at least one housing portion of cylindrical shape has a recess extending transversely to the longitudinal axis of the housing portion and with a width corresponding to the outer diameter of the thread of the clamping screw. With this construction, the hose clamp can relatively easily be arranged on a hose and the clamping screw can be angled into said recess and then be turned so that the housing portions are moved closer to each other and in this way the hose clamp is tightened.

Moreover, said recess in the housing portion preferably has a countersink for the head of the clamping screw. This allows locking so that the clamping screw is prevented from unintentionally leaving its position, that is the countersink ensures that the hose clamp does not come off in case of, for instance, impacts.

In one embodiment of the hose clamp, a second band is arranged radially inside, seen from the centre of the hose clamp, and adjacent to the clamping screw for separating, when using the hose clamp, the hose arranged in the hose clamp and the clamping screw. In this way the hose is protected from the clamping screw and vice versa, that is, with this solution, material from the hose is prevented from sticking to the thread of the clamping screw, which in turn can possibly deteriorate the function of the hose clamp.

Preferably, said second band has a radius of curvature corresponding to the radius of the hose clamp to ensure that the hose is subjected to a load which is as uniform as possible.

Moreover, said second band preferably has edges folded radially outwards, seen from the centre of the hose clamp, for guiding said first band in the axial direction.

Preferably said second band is attached to said first band so that it is always correctly positioned.

Furthermore, said second band is preferably attached to said first band only at one end of the open ring so that automatic adjustment of the second band relative to the first band is conceivable while tightening the clamping screw.

In an alternative embodiment of the hose clamp, the bands adjacent to the housing portions have slots with a width greater than the outer diameter of the thread of the clamping screw. The advantage of this solution is that the band portions at the side of the slot adjacent to the head of the clamping screw need only be turned, that is only at one of the ends of the open ring which forms part of the hose clamp.

In a further alternative embodiment, the band loop is along the slot, at both ends of the open ring, angled upwards on both sides of the slot in such a manner that the distance between the band portions angled upwards adjacent to the slot is greater than the outer diameter of the head of the clamping screw to make the screw reversible. This can be advantageous if the hose clamp is arranged on a hose but the head of the clamping screw is difficult to reach with a tool. By making the housing portions changing places and consequently also reversing the clamping screw, it is to be hoped that it will be easier to reach the head of the clamping screw with a tool.

Said band is preferably steel plate. Steel plate is easy to machine, has great strength and is relatively cheap. It is, of course, possible to make the band of some other material as long as it has properties making it possible for the band at the side of the slots to maintain its turned shape when subjected to a load.

BRIEF DESCRIPTION OF THE FIGURES

The invention will in the following be described in more detail with reference to the accompanying schematic drawings which by way of example illustrate various embodiments of the invention.

DESCRIPTION OF PREFERRED EMBODIMENTS

Figure 1:
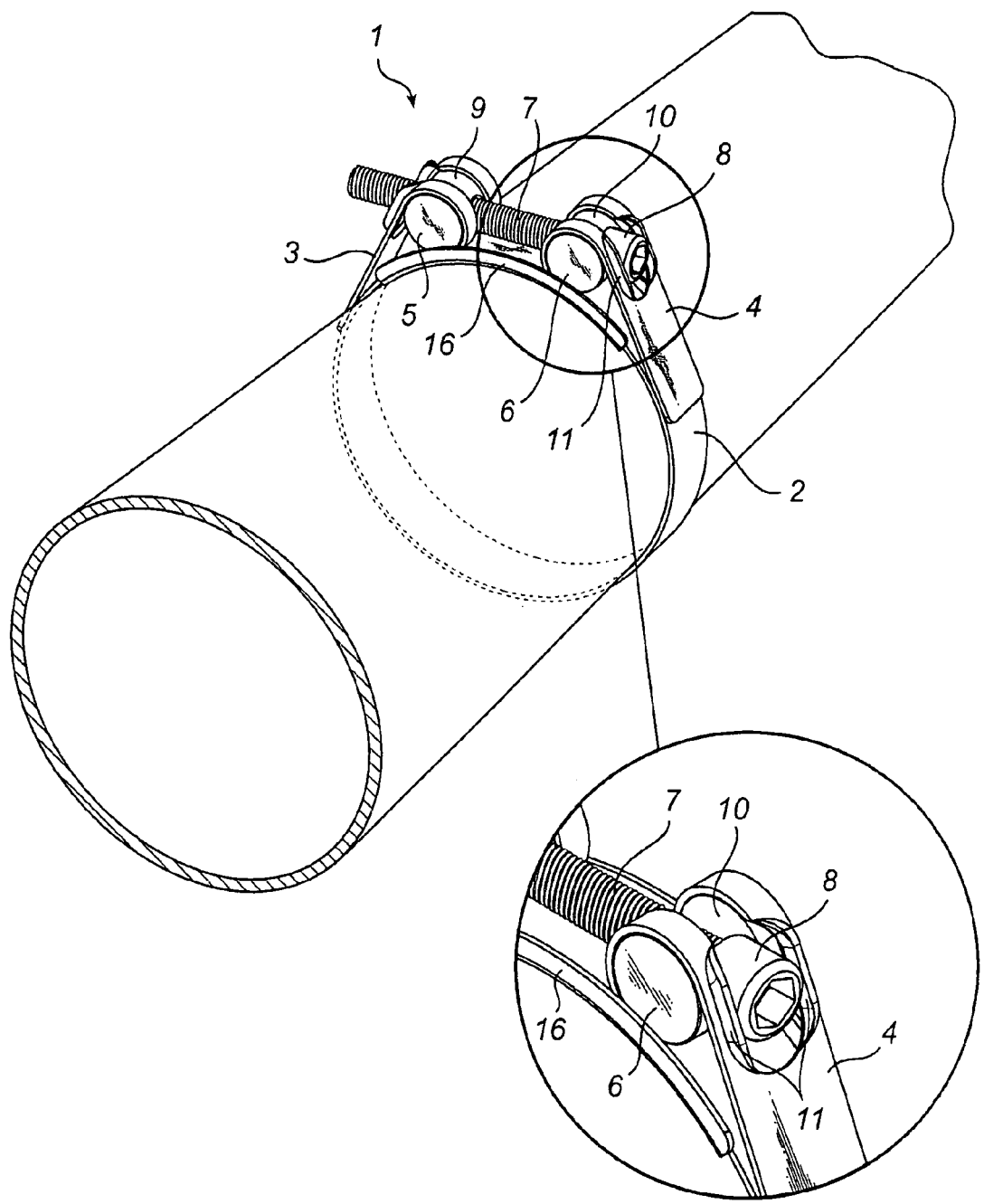
FIG. 1 is a perspective view of a hose clamp according to the present invention arranged on a hose.

FIG. 1 shows a hose clamp 1 according to an embodiment of the invention. The hose clamp 1 comprises a sheet-metal band 2 whose ends extend in loops 3, 4 around cylindrical housing portions 5, 6, between which housing portions 5, 6 a clamping screw 7 with a head 8 is arranged. Adjacent to the housing portions 5, 6, slots 9, 10 are punched in the sheet metal band 2. Adjacent to the head 8 of the clamping screw 7, the sheet metal band is at the side of the slot 10 angled upwards to increase the width of the slot 10 so that the head 8 of the clamping screw 7 can be inserted through the slot 10, that is the width of the slot 10 adjacent to the head of the clamping screw 7 is slightly greater than the outer diameter of the head 8. Preferably, there are soft transitions between the turned portions 11 and the other portions of the band adjacent to the slot for increased strength. One cylindrical housing portion 5 has a threaded hole adjusted to the clamping screw.

Figure 2:
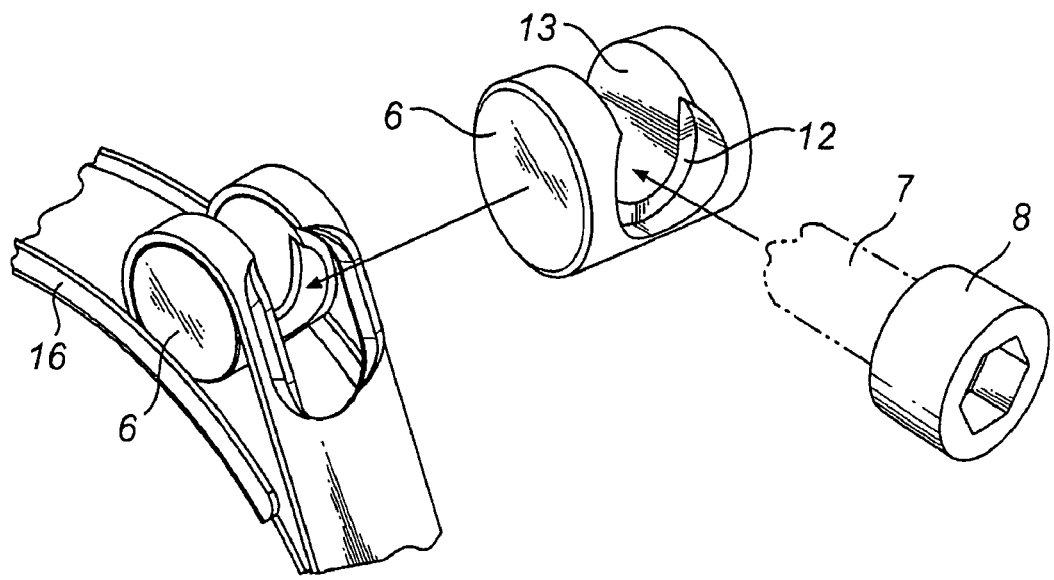
FIG. 2 is a perspective view of a detail of the hose clamp in FIG. 1.

FIG. 2 shows the countersink 12 for the head 8 of the clamping screw 7. The clamping screw 7 can thus be placed in the recess 13 and the head 8 locks the clamping screw 7 by means of the countersink 12 in the correct position, in which the screw can be turned to tighten the hose clamp 1. In the embodiment shown, the clamping screw 7 is only by way of example adapted to be turned with an Allen key.

Figure 3:
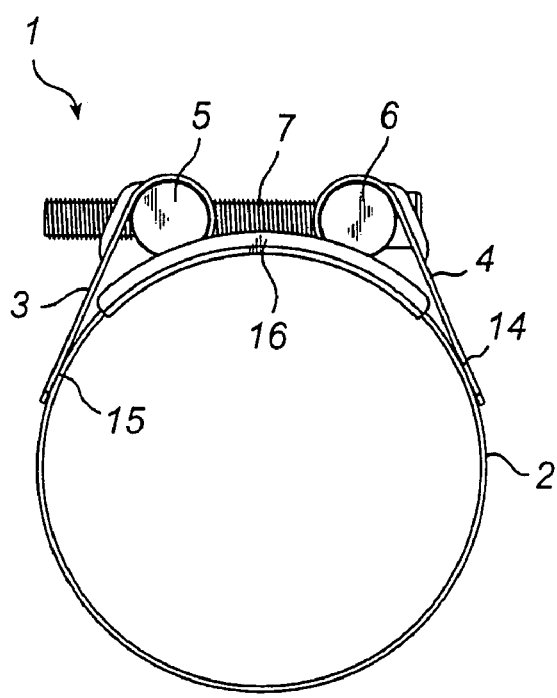
FIG. 3 is a side view of the hose clamp in FIG. 1 (axially with a hose intended for the hose clamp).

FIG. 3 shows the hose clamp 1 from the side, that is along the axis of a hose intended for the hose clamp 1. In the embodiment illustrated, it is shown how the band 2, after having extended in loops 3, 4, returns to portions 14, 15 of the band 2 which constitute the outside of the open band ring 2. The loops can be welded for instance. By thus connecting the end of the band 2 to the outside of the hose clamp 1, an even contact is maintained between the hose and the hose clamp 1. To prevent the hose from abutting against the clamping screw, a band portion 16 is preferably arranged as an extension of the open band ring 2. The band portion 16 is suitably attached to one of the closed loops 3, 4. The band portion 16 preferably also has edge portions which are folded to form a guide groove for the band 2.

Figure 4:
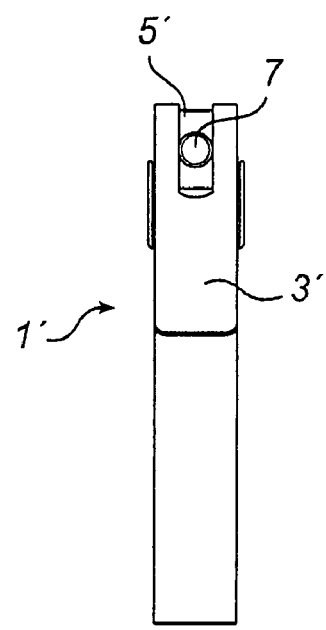
FIG. 4 is a view of a variant of the hose clamp illustrated axially with the clamping screw.

An alternative embodiment of the hose clamp 1' is shown in FIG. 4. The slot adjacent to the cylindrical housing portion 5' has, without upward angling of the band 3' adjacent to the slot, at least the same width as the outer diameter of the screw 7. In this embodiment, it is thus only adjacent to the head of the clamping screw that the band needs to be angled upwards, which means one less operation. However, the clamping screw 7 cannot be reversed in this embodiment.

It will be appreciated that many modifications of the above-described embodiment of the invention are conceivable within the scope of the invention, as defined by the appended claims. For instance as described above, the housing portions may have some other shape than cylindrical, for instance an oval cross-section if the radial overall height is desired to be smaller.

The invention claimed is:

1. A hose clamp, comprising:
   at least one band forming an open ring, ends of the open ring having band loops arranged around housing portions, and
   a clamping screw having a head arranged between the housing portions,
   wherein:
   the band loops adjacent to the housing portions include slots,
   one of the housing portions adjacent to the head of the clamping screw has an open recess extending transversely to a longitudinal axis of the housing portion having a width corresponding to an outer diameter of a thread of the clamping screw, to allow the clamping screw to be angled into the open recess,
   at least one of the band loops along the slot, adjacent to the head of the clamping screw, is angled upwards on both sides of the slot by a pair of parallel turned portions in such a manner that a distance between the turn portions is greater than an outer diameter of the head of the clamping screw, and
   a length of the turned portions is shorter than a length of the slot.

2. The hose clamp as claimed in claim 1, wherein at least one of the housing portions is cylindrical, around which cylindrical portion of said band loop extends at least along part of a circumferential surface of the cylindrical portion.

3. The hose clamp as claimed in claim 1, wherein the at least one band of the open ring and the band loops at the ends of the open ring consist of a single band.

4. The hose clamp as claimed in claim 3, wherein at least at one end of the band forms a closed loop, the end portion of the end of the band being attached to a band material on a portion adjoining the band loop.

5. The hose clamp as claimed in claim 2, wherein said at least one housing portion of cylindrical shape has a threaded through-hole with an inlet and an outlet in the circumferential surface, in which the clamping screw is screwable therethrough.

6. The hose clamp as claimed in claim 2, wherein said at least one housing portion of cylindrical shape has a width corresponding to an outer diameter of a thread of the clamping screw.

7. The hose clamp as claimed in claim 6, wherein said open recess in the housing portion has a countersink for the head of the clamping screw.

8. The hose clamp as claimed in claim 1, wherein a second band is arranged radially inside, in relation to a center of the hose clamp, and adjacent to the clamping screw for separating, when using the hose clamp, a hose is arranged in the hose clamp and the clamping screw.

9. The hose clamp as claimed in claim 8, wherein said second band has a radius of curvature corresponding to a radius of the hose clamp.

10. The hose clamp as claimed in claim 8, wherein said second band has edges folded radially outwards, in relation to a center of the hose clamp, for guiding said first band in the axial direction.

11. The hose clamp as claimed in claim 8, wherein said second band is attached to said first band.

12. The hose clamp as claimed in claim 11, wherein said second band is attached to said first band only at one end of the open ring.

13. The hose clamp as claimed in claim 1, wherein the bands adjacent to the housing portions have slots with a width greater than an outer diameter of a thread of the clamping screw.

14. The hose clamp as claimed in claim 1, wherein the band loop along the slot, at both ends of the open ring, is angled upwards on both sides of the slot in such a manner that the distance between the band portions angled upwards adjacent to the slot is greater than the outer diameter of the head of the clamping screw.

15. The hose clamp as claimed in claim 1, wherein said band is a steel plate.

16. A hose clamp, comprising:
at least one band forming an open ring, ends of the open ring having band loops arranged around housing portions, and
a clamping screw having a head arranged between the housing portions,
wherein:
the band loops adjacent to the housing portions include slots,
one of the housing portions adjacent to the head of the clamping screw has an open recess extending transversely to a longitudinal axis of the housing portion having a width corresponding to an outer diameter of a thread of the clamping screw, to allow the clamping screw to be angled into the open recess,
the band loop along the slot, adjacent to the head of the clamping screw, is angled away from the housing portion on both sides of the slot by a pair of parallel turned portions in such a manner that a distance between turned portions is greater than an outer diameter of the head of the clamping screw, and
a length of the turned portions is shorter than a length of the slot.

* * * * *